(12) United States Patent
Chou

(10) Patent No.: US 11,053,598 B2
(45) Date of Patent: Jul. 6, 2021

(54) METHOD FOR PRODUCING CORE SHELL NANOPARTICLES

(71) Applicant: HONDA MOTOR CO., LTD., Tokyo (JP)

(72) Inventor: Nam Hawn Chou, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 379 days.

(21) Appl. No.: 15/893,220

(22) Filed: Feb. 9, 2018

(65) Prior Publication Data

US 2018/0230611 A1 Aug. 16, 2018

Related U.S. Application Data

(60) Provisional application No. 62/459,933, filed on Feb. 16, 2017.

(51) Int. Cl.
*C25B 11/091* (2021.01)
*B01J 27/12* (2006.01)
(Continued)

(52) U.S. Cl.
CPC ............ *C25B 11/091* (2021.01); *B01J 23/02* (2013.01); *B01J 23/10* (2013.01); *B01J 27/12* (2013.01);
(Continued)

(58) Field of Classification Search
CPC .... C25B 1/00; C25B 3/04; C25B 9/06; C25B 11/035; C25B 11/04; C25B 11/0405; C25B 11/0478; B01J 23/02; B01J 23/10; B01J 27/12; B01J 27/138; B01J 35/0013; B01J 35/0073; B01J 35/0086; B01J 35/1061; B01J 37/082; B22F 1/0088; B22F 1/02; B22F 1/0051; H01M 4/90; B82Y 30/00
See application file for complete search history.

(56) References Cited

U.S. PATENT DOCUMENTS 9,528,192 B1 12/2016 Chen
2005/0032635 A1* 2/2005 Yu .................. H01M 4/926
502/180
(Continued)

FOREIGN PATENT DOCUMENTS

CN 101931081 A 12/2010
CN 102284293 A 12/2011
(Continued)

OTHER PUBLICATIONS

Extended European Search Report for related European Application No. 18157111.8 dated May 2, 2018.
(Continued)

*Primary Examiner* — Ciel P Contreras
(74) *Attorney, Agent, or Firm* — Arent Fox LLP

(57) ABSTRACT

An electrode material which may be used in an electrochemical cell used to convert carbon dioxide into useful products, such as synthetic fuel. The electrode material may comprise nano-sized core-shell catalyst (i.e., core-shell nanoparticles, or CSNs) having a catalytic core component encompassed by one or more outer shells, wherein at least one of the outer shells has a mesoporous structure. Electrochemical cells, electrochemical cell electrodes, and methods of making CSNs are also provided.

30 Claims, 3 Drawing Sheets

(51) Int. Cl.
| | |
|---|---|
| B01J 27/138 | (2006.01) |
| B01J 35/00 | (2006.01) |
| B01J 35/10 | (2006.01) |
| B01J 23/02 | (2006.01) |
| B01J 23/10 | (2006.01) |
| B01J 37/08 | (2006.01) |
| H01M 4/90 | (2006.01) |
| C25B 11/031 | (2021.01) |
| C25B 11/051 | (2021.01) |
| C25B 1/00 | (2021.01) |
| B22F 1/02 | (2006.01) |
| B22F 1/00 | (2006.01) |
| C25B 11/04 | (2021.01) |
| C25B 3/25 | (2021.01) |
| C25B 9/17 | (2021.01) |
| B82Y 30/00 | (2011.01) |

(52) U.S. Cl.
CPC ......... *B01J 27/138* (2013.01); *B01J 35/0013* (2013.01); *B01J 35/0073* (2013.01); *B01J 35/0086* (2013.01); *B01J 35/1061* (2013.01); *B01J 37/082* (2013.01); *B22F 1/0088* (2013.01); *B22F 1/02* (2013.01); *C25B 1/00* (2013.01); *C25B 3/25* (2021.01); *C25B 9/17* (2021.01); *C25B 11/031* (2021.01); *C25B 11/04* (2013.01); *C25B 11/051* (2021.01); *H01M 4/90* (2013.01); *B22F 1/0051* (2013.01); *B82Y 30/00* (2013.01)

(56) References Cited

U.S. PATENT DOCUMENTS

| | | | |
|---|---|---|---|
| 2009/0269269 A1 | 10/2009 | White et al. | |
| 2010/0056366 A1 | 3/2010 | Lee | |
| 2010/0258759 A1* | 10/2010 | Archer | B82Y 30/00 |
| | | | 252/62.56 |
| 2011/0200915 A1 | 8/2011 | Goto et al. | |
| 2011/0311635 A1* | 12/2011 | Stucky | B01J 13/02 |
| | | | 424/490 |
| 2014/0106260 A1 | 4/2014 | Cargnello et al. | |
| 2014/0291163 A1 | 10/2014 | Kanan et al. | |
| 2016/0076158 A1 | 3/2016 | Tamura et al. | |
| 2016/0215404 A1 | 7/2016 | Palmore et al. | |

FOREIGN PATENT DOCUMENTS

| | | |
|---|---|---|
| CN | 103566934 A | 2/2014 |
| CN | 104549412 A | 4/2015 |
| CN | 105080564 A | 11/2015 |
| CN | 105304910 A | 2/2016 |
| FR | 2988405 B1 | 4/2015 |
| JP | 4169140 B2 | 10/2008 |
| KR | 101626014 B1 | 6/2016 |
| KR | 101647338 B1 | 8/2016 |
| WO | WO 2008/048716 A2 | 4/2008 |
| WO | WO 2014/042782 A1 | 3/2014 |
| WO | WO 2016/030749 A1 | 3/2016 |
| WO | WO 2016/054400 A1 | 4/2016 |

OTHER PUBLICATIONS

A. Martinez-Arias et al., "Interfacial Redox Processes under CO/O2 in a Nanoceria-Supported Copper Oxide Catalyst", Journal Physical Chemistry, vol. 108, pp. 17983-17991, Oct. 23, 2004.

Huizhi Bao et al., "Compositions, Structures, and Catalytic Activities of CeO2@Cu2O Nanocomposites Prepared by the Template-Assisted Method" ACS Publications, pp. A-J, May 15, 2014.

Junhua Song et al., "Reduction of Nano CuO: Crystallite-Size Dependent and the Effect of Nano-Ceria Support" The Journal of Physical Chemistry, Jun. 9, 2015.

Nachal D. Subramanian et al., "Copper Core-Porous Manganese Oxide Shell Nanoparticles" The Journal of Physical Chemistry, vol. 115, pp. 14500-14506, Jun. 23, 2011.

Vladimir Matolin et al., "Photoemission Spectroscopy Study of Cu/CeO2 Systems: Cu/CeO2 Nanosized Catalyst and CeO2(111)/Cu(111) Inverse Model Catalyst" Journal of Physical Chemistry, vol. 112, pp. 3751-3758, Feb. 14, 2008.

* cited by examiner

METHOD FOR PRODUCING CORE SHELL NANOPARTICLES

CROSS-REFERENCE TO RELATED APPLICATIONS

This application claims the benefit of priority to U.S. patent application Ser. No. 62/459,933 entitled "Method for Producing Core Shell Nanoparticles" filed on Feb. 16, 2017, the entirety of which is incorporated by reference herein.

FIELD

This disclosure relates generally to core-shell nanoparticles, methods for making the same, and use of the same as catalysts.

BACKGROUND

Electrochemical systems that reduce carbon dioxide when energized provide an attractive power source option as they are able not only to offset emissions of carbon dioxide (the primary greenhouse gas), but also to convert carbon dioxide into fuels and other useful products. However, this type of electrochemical cell poses major technological challenges, such as low catalytic activity, product selectivity, and stability of electrodes used in this type of system, among others.

SUMMARY

Aspects of the present disclosure generally relate to an electrode material which may be used, for example, in an electrochemical cell for converting carbon dioxide into useful products, such as synthetic fuel. The electrode material may comprise nano-sized core-shell catalyst (i.e., core-shell nanoparticles, or CSNs) having a catalytic core component encompassed by one or more outer shells. At least one of the outer shells may have a mesoporous structure.

Aspects of the present disclosure also relate generally to methods of making the CSNs described herein. The method may comprise coating a catalytic core with a temporary shell component, heating the coated catalytic core to convert the temporary shell component into a mesoporous structure, depositing a shell material onto the temporary shell component, and removing the temporary shell component to provide a catalytic core component encompassed by a mesoporous shell comprising the shell material.

Aspects of the present disclosure also relate generally to electrochemical cell electrodes and electrochemical cells that electrochemically convert carbon dioxide into, for example, useful fuels (e.g., synthetic fuels) or other products, and which comprise the electrode material described herein.

DETAILED DESCRIPTION OF THE INVENTION

Aspects of the present disclosure generally relate to an electrode material which may be used, for example, in an electrochemical cell for converting carbon dioxide into useful products, such as synthetic fuel. The electrode material may comprise nano-sized core-shell catalyst (i.e., core-shell nanoparticles, or CSNs) having a catalytic core component encompassed by one or more outer shells. At least one of the outer shells may have a mesoporous structure.

As used herein, the term "CSN" refers to a nano-sized particle having a catalytic core component encompassed by one or more shells. The CSNs of the present disclosure, in accordance with some aspects, may advantageously have a multifunctional role in improving the effectiveness and/or efficiency of electrocatalytic reduction of carbon dioxide in electrocatalytic cells. For example, the CSNs of the present disclosure may improve the effectiveness and/or efficiency of electrocatalytic reduction of carbon dioxide by providing a catalyst-containing electrode with a high level of catalytic activity, product selectivity, and/or stability.

The CSNs according to aspects of the present disclosure comprise a catalytic core component encompassed by one or more outer shells, wherein the catalytic core component comprises one or more catalytic materials. As used herein, a "catalytic material" refers to a material useful for causing or accelerating (i.e., "catalyzing") a chemical reaction. For example, the catalytic material may be a material that, at least in part, catalyzes the conversion of carbon dioxide into, for example, useful fuels or other products.

Examples of catalytic materials that may be used according to aspects of the present disclosure include, but are not limited to, metals (e.g., copper, cobalt, iron, nickel, lead, and tin) and/or alloys and/or oxides thereof.

As used herein, the term "catalytic core component" refers to the inner part of a CSN.

The catalytic core component may be synthesized by any method known in the art. For example, the catalytic core component may be synthesized by mixing a metal precursor solution with a reducing agent to form metal nanoparticles. In some embodiments, the catalytic core component may be synthesized in the presence of a stabilizer that prevents or otherwise inhibits oxidation of the catalytic core component during synthesis, and is readily removable from the catalytic core component prior to formation of a shell thereon. For example, bulky polymers such as polyvinylpyrrolidone (molecular weight of 55,000 g/mol) used during catalytic core component synthesis inhibit oxidation of the catalytic core component. However, such stabilizers are not readily removable from the catalytic core component following synthesis. Without being limited to any particular theory, residual stabilizer can form an additional layer between the catalytic core component and the shell that detracts from the performance of the CSNs in the desired system.

Figure 1A:
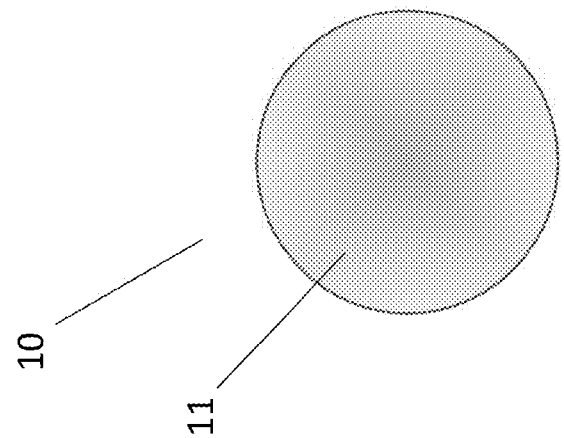
FIG. 1a is a cutaway schematic depicting an example solid catalytic core component of a CSN, according to aspects of the present disclosure.

According to some aspects, the catalytic core component may be a solid core component. As used herein, the term "solid" means not hollow, for example. As shown in FIG. 1a, the solid core component 10 may comprise one or more catalytic materials 11. For example, the solid core component may comprise a first catalytic material, such as a metal.

Figure 1B:
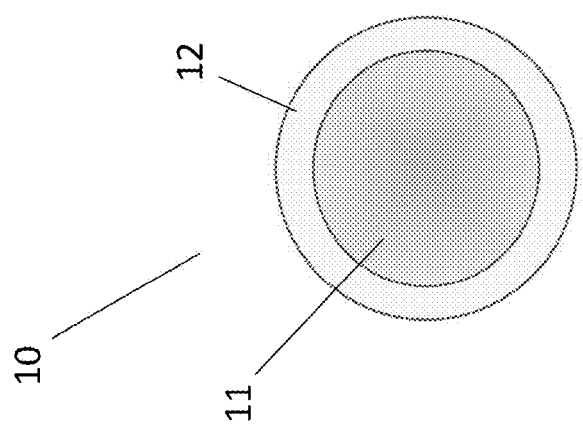
FIG. 1b is a cutaway schematic depicting an example solid catalytic core component of a CSN with a coating, according to aspects of the present disclosure.

As shown in FIG. 1b, the solid core component 10 may additionally comprise a second catalytic material 12 which coats the first catalytic material 11. For example, the coating may comprise a metal oxide. According to some aspects, the coating may be formed by heating the first catalytic material in air, electrochemically oxidizing an outer layer of the first catalytic material, and/or depositing a second catalytic material on the first catalytic material. The coating may provide complete coverage of the first catalytic material (i.e., cover 100% of the first catalytic material's surface area) or may provide partial coverage of the first catalytic material (i.e., cover less than 100% of the first catalytic material's surface area).

Figure 1C:
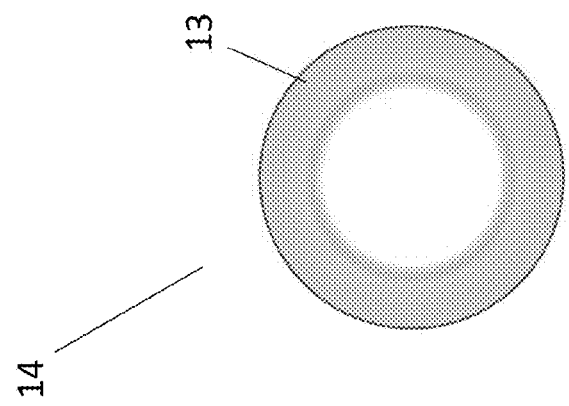
FIG. 1c is a cutaway schematic depicting an example hollow catalytic core component of a CSN, according to aspects of the present disclosure.

According to some aspects, the catalytic core component may not be solid. For example, the catalytic core component may be hollow, such as a hollow sphere. As shown in FIG. 1c, for example, the hollow core component 14 may comprise one or more first catalytic materials 13. For example, the hollow core component may comprise a metal oxide. The hollow sphere may optionally also comprise a second catalytic material which coats the first catalytic material, as discussed above.

Figure 2:
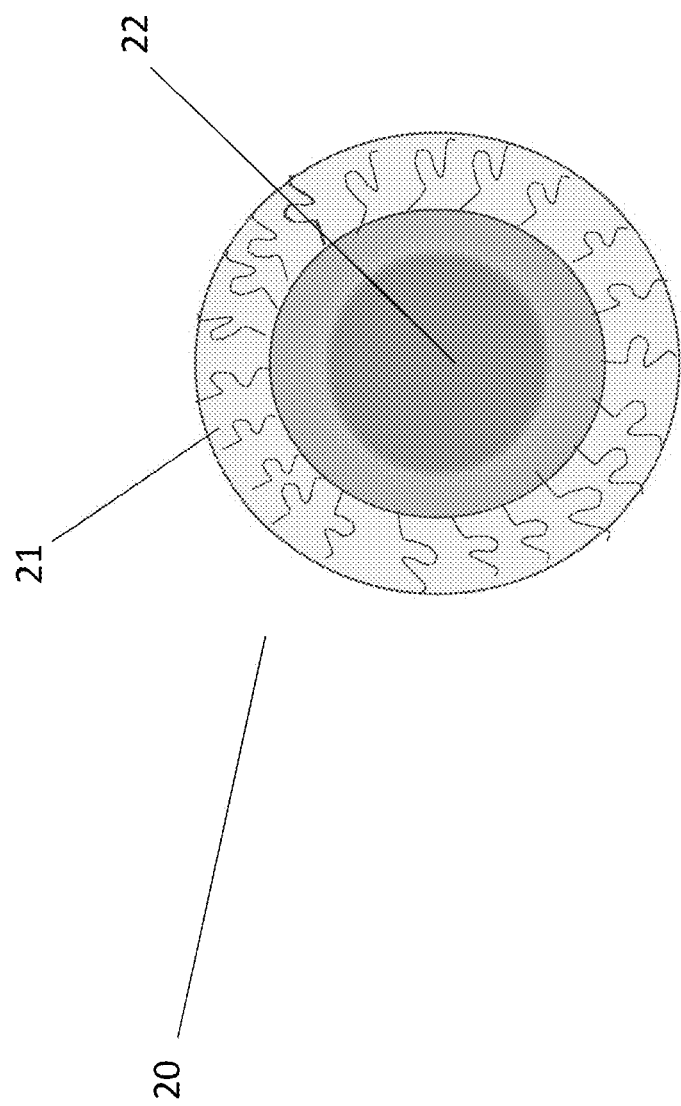
FIG. 2 is a cutaway schematic depicting a CSN according to aspects of the present disclosure.

According to some aspects, the catalytic core component may be encompassed by one or more outer shells. As shown in FIG. 2, the CSN 20 may comprise an outer shell 21 encompassing the catalytic core component 22, which may be any of the catalytic core components as described herein. As shown in FIG. 2, the outer shell 21 may be a mesoporous shell. As used herein, the term "mesoporous" means containing pores with diameters between 2 and 50 nm, for example.

The outer shell may cover, for example, at least 90% of the catalytic core component's surface area, at least 80% of the catalytic core component's surface area, at least 70% of the catalytic core component's surface area, at least 60% of the catalytic core component's surface area, at least 50% of the catalytic core component's surface area, at least 40% of the catalytic core component's surface area, at least 30% of the catalytic core component's surface area, at least 20% of the catalytic core component's surface area, or at least 10% of the catalytic core component's surface area.

The outer shell may comprise, for example, a shell material with certain desirable characteristics, particularly when used in electrochemical cells that electrochemically convert carbon dioxide into fuels, polymers, and/or other products. One desirable characteristic of the shell material may be its interaction with carbon dioxide and/or carbonate ions. For example, the shell material may interact with carbon such that carbon dioxide and/or carbonate ions are absorbed and/or chemisorbed onto the CSN surface via a strong chemical bond. This interaction may also provide a single monolayer type of carbon dioxide and/or carbonate ions on the CSN surface. For example, a nanoparticle catalyst without the shell material may exhibit a series of binding modes with carbon dioxide and/or carbonate ions (e.g., bending, linear, oxygen binding, and/or carbon binding to catalytic surfaces), whereas CSNs according to the present disclosure may exhibit a single binding mode. This characteristic, at least in part, may increase the local concentration of carbon dioxide and/or carbonate ions on the surface of the CSN and/or the amount of time carbon dioxide and/or carbonate ions are adsorbed and/or chemisorbed on the surface of the CSN (and thus, the concentration of carbon dioxide and/or carbonate ions available to be catalyzed by the catalytic core component) when compared to nanoparticles without the shell material. This characteristic may also aid in increasing reaction product specificity. The shell material may thus, for example, help overcome problems associated with poor solubility of carbon dioxide in aqueous electrolytes, and enhance the catalytic activity of and the specificity of the reaction product produced by this type of electrochemical cell.

Another desirable characteristic of the shell material may be that it modifies the pH of the surface of the CSN. For example, the shell material may modify the basicity of the CSN surface. Such a pH modification may, for example, affect adsorption and/or chemisorption of carbon dioxide and/or carbonate ions on the surface of the CSN (and thus, the concentration of carbon dioxide/carbonate ions available to be catalyzed by the catalytic core component).

Another desirable characteristic of the shell material may be that it lowers the binding energy of reaction intermediates to the CSN. For example, a reaction catalyzed by a catalyst with a high binding energy of reaction intermediates generally requires more energy than a reaction catalyzed by a catalyst with a lower binding energy. By lowering the binding energy of reaction intermediates, the shell material may thus improve the catalytic activity of the catalytic core component by reducing the amount of energy required by a reaction.

Another desirable characteristic of the shell material may be its effect on electron turnover. For example, the shell material may comprise a component that facilitates fast electron turnover, which may increase the rate of conversion of carbon dioxide by the catalytic core component compared to catalyst nanoparticles without the shell material.

The shell material may possess some or all of the above characteristics, among others.

The shell material may comprise a halogen. The halogen may, for example, be capable of forming a strong chemical bond with carbon. According to some aspects, the halogen may be comprised by an anion of a halide and/or a ternary compound. For example, the shell material may comprise a fluoride and/or an oxyfluoride.

The shell material may comprise oxygen. According to some aspects, the oxygen atom may be comprised by an anion, for example, an anion of an oxide, hydroxide, and/or an oxyfluoride The shell material may also comprise a metal. The metal, for example, may be capable of providing a redox couple that facilitates fast electron turnover during the reduction of carbon dioxide. According to some aspects, the metal may be comprised by the cation of a halide, oxide, hydroxide, and/or ternary compound. Examples of metals that may be used in the shell material include, but are not limited to, lanthanum, calcium, cerium, magnesium, and manganese.

Examples of shell materials that may be used according to the present disclosure include, but are not limited to, $LaF_3$, $CeF_3$, $CaF_2$, $MgF_2$, LaOF, CeOF, $La_2O_3$, $CeO_2$, CaO, MgO, $La(OH)_3$, $Ca(OH)_2$, $Ce(OH)_3$, $Ce(OH)_4$, $Mg(OH)_2$, and combinations thereof.

Aspects of the present disclosure also relate generally to methods of making the CSNs herein.

The method may comprise first providing a catalytic core component as described herein, and coating the catalytic core component with a temporary shell component. As used herein, the term "temporary shell component" refers to a component which is used in the process of making the CSNs but is at least partially removed during the process.

Examples of temporary shell components useful according to the present disclosure include, but are not limited to, $SiO_2$ and metal oxides having similar chemical and physical properties to $SiO_2$, such as $TiO_2$, $Al_2O_3$, and/or ZNO.

The catalytic core component may be coated with the temporary shell component by any means known in the art. According to some aspects, the temporary shell component may cover, for example, at least 50% of the surface area of the catalytic core component, preferably at least 60%, more preferably at least 70%, even more preferably at least 80%, even more preferably at least 90%, and most preferably 100%.

The method may comprise heating the catalytic core component coated with the temporary shell component in conditions sufficient for the temporary shell component to be converted into a mesoporous structure. For example, heating the catalytic core component may comprise calcination. As used herein, the term "calcination" refers to heating a composition sufficient to promote thermal decomposition. According to some aspects, calcination may comprise heating to high temperatures in air and/or oxygen and/or an inert gas. However, calcination may also refer to a thermal process comprising limited or no air and/or oxygen and/or inert gas.

For example, the catalytic core component coated with the temporary shell component may be heated to a temperature of from 250° C.-400° C., preferably from 275° C.-375° C., even more preferably from 300° C.-350° C. The catalytic core component coated with the temporary shell component may be heated for a time sufficient to convert the temporary shell component into a mesoporous structure. For example, the catalytic core component coated with the temporary shell component may be heated for a time of between about 1 and 10 hours, preferably between about 1 and 8 hours, and more preferably between about 2 and 6 hours. It should be understood that heating times may be affected by one or more conditions, including the thickness of the temporary shell component, the nature of any stabilizers present, and the atmosphere in which the component is heated (e.g., air and/or oxygen and/or inert gas).

Once the temporary shell component has been converted into a mesoporous structure, a shell material may be deposited onto the mesoporous structure. The shell material may comprise any of the shell materials described herein.

The shell material may be deposited onto the mesoporous structure by any means known in the art sufficient to deposit the shell material onto at least, for example, 50% of the surface area of the mesoporous structure, preferably at least 60%, more preferably at least 70%, even more preferably at least 80%, even more preferably at least 90%, and most preferably 100%. For example, a precursor of the shell material may be combined and/or mixed with the nanoparticles (i.e., the catalytic core component coated with the temporary shell component mesoporous structure) such that the shell material is sufficiently deposited onto the mesoporous structure.

Once the shell material is deposited onto the mesoporous structure, the method may comprise removing the temporary shell component to provide a catalytic core component encompassed by a mesoporous shell comprising the shell material.

For example, the temporary shell component may be removed via etching. As used herein, the term "etching" refers to the process of selectively chemically dissolving, decomposing, and/or otherwise removing a component using an etching agent, for example. Etching agents useful according to the present disclosure include, but are not limited to, strong acids and/or strong bases, such as NaOH, HF, KOH, LiOH, RbOH, HI, HBr, and HCl. As used herein, the term "strong base" and "strong acid" refers to a base or acid, respectively, that completely dissociates in water.

The method may comprise contacting the nanoparticle (i.e., comprising the catalytic core component coated with the temporary shell component mesoporous structure having the shell material deposited thereon) with the etching agent such that the temporary shell component is partially or completely removed. According to some aspects, for example, at least 50% of the temporary shell component is removed, preferably at least 60%, more preferably at least 70%, even more preferably at least 80%, even more preferably at least 90%, and most preferably 100%.

Aspects of the present disclosure also relate generally to electrochemical cell electrodes and electrochemical cells that electrochemically convert carbon dioxide to, for example, useful fuels (e.g., synthetic fuels) or other products, and which comprise the electrode material herein. The term "electrochemical cell" refers to a device and/or device components that facilitate chemical reactions through the introduction of electrical energy. Electrochemical cells have two or more electrodes (e.g., positive and negative electrodes) and an electrolyte.

Figure 3:
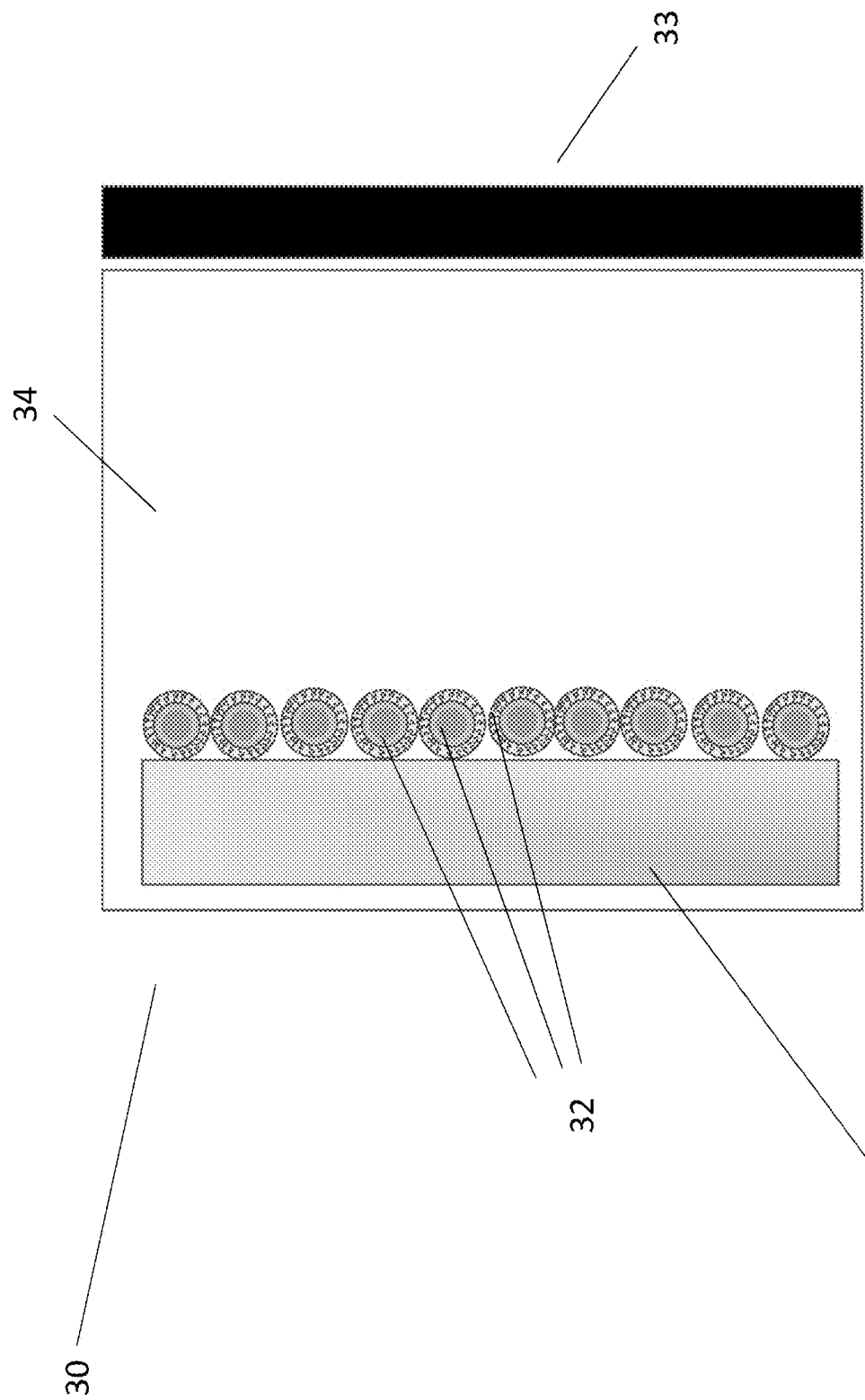
FIG. 3 is a cutaway schematic depicting an electrochemical cell, according to aspects of the present disclosure.

Aspects of the present disclosure are also related generally to electrochemical cells and electrochemical cell electrodes comprising the CSNs described herein. In particular, as shown in FIG. 3, the electrochemical cells 30 of the present disclosure may comprise, for example, at least a cathode 31 comprising CSNs 32, an anode 33, and a liquid electrolyte 34, and may convert carbon dioxide to useful products (e.g., fuels, polymers, etc.) when the cell is energized. For example, the electrochemical cell may reduce carbon dioxide to carbon monoxide, a C2-C3 alkane, a C2-C3 alkene, a C2-C3 alcohol, a C2-C3 carboxylic acid, a C2-C3 aldehyde, or a combination thereof. According to some aspects, the electrochemical cell is energized without creating any additional carbon dioxide.

The electrochemical cell may comprise an electrode (e.g., a cathode) that includes an electrocatalyst, specifically an electrocatalyst comprising the CSNs as described herein. The electrodes of the present disclosure exhibit certain distinguishing properties over previously known electrodes. For example, electrodes according to the present disclosure may exhibit higher catalytic activity, stability, and selectivity compared with other electrodes known in the art. These distinguishing properties may, at least in part, result from the combination of the catalytic core component and one or more outer shells of the CSNs.

For example, the electrodes of aspects of the present disclosure may exhibit a higher stability than known electrodes, due, at least in part, to the outer shell of the CSNs. For example, the outer shell may protect the catalytic core component from corrosion by an electrolyte solution and/or suppress hydrogen evolution reactions. The outer shell may also reduce or inhibit carbon deposition and/or metal deposition from impurities in the electrolyte, which can reduce catalytic performance over time. The electrodes of the present disclosure may also exhibit a higher catalytic activity and/or selectivity due, at least in part, to the desirable characteristics of the shell material, as described herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A method of making core-shell nanoparticles comprising:
   providing a catalytic core component comprising a catalytic material;
   coating the catalytic core component with a temporary shell component;
   heating the catalytic core component coated with the temporary shell component to convert the temporary shell component into a mesoporous structure;
   depositing a shell material onto the mesoporous structure;
   removing the mesoporous structure to provide a core-shell nanoparticle having a catalytic core encompassed by a mesoporous shell comprising the shell material,
   wherein the temporary shell component comprises $SiO_2$.

2. The method according to claim 1, wherein the heating of the catalytic core component coated with the temporary shell component is performed at a temperature of between 300° C.-350° C.

3. The method according to claim 1, wherein the removing of the mesoporous structure comprises etching.

4. The method according to claim 3, wherein the etching comprises selectively chemically removing the mesoporous structure using an etching agent.

5. The method according to claim 4, wherein the etching agent comprises a strong acid and/or a strong base.

6. The method according to claim 1, wherein the catalytic material comprises a metal and/or an alloy thereof and/or an oxide thereof.

7. The method according to claim 6, wherein the metal is copper.

8. The method according to claim 1, wherein the shell material comprises a fluoride, an oxyfluoride, an oxide, and/or a hydroxide.

9. The method according to claim 8, wherein the shell material further comprises a metal.

10. The method according to claim 9, wherein the shell material is selected from the group consisting of $LaF_3$, $CeF_3$, $CaF_2$, $MgF_2$, LaOF, CeOF, $La_2O_3$, $CeO_2$, CaO, MgO, $La(OH)_3$, $Ca(OH)_2$, $Ce(OH)_3$, $Ce(OH)_4$, $Mg(OH)_2$, and combinations thereof.

11. A method of making core-shell nanoparticles comprising:
    providing a catalytic core component comprising a catalytic material;
    coating the catalytic core component with a temporary shell component;
    heating the catalytic core component coated with the temporary shell component to a temperature of between 300° C. and 350° C. in order to convert the temporary shell component into a mesoporous structure;
    depositing a shell material onto the mesoporous structure; and
    removing the mesoporous structure to provide a core-shell nanoparticle having a catalytic core encompassed by a mesoporous shell comprising the shell material.

12. The method according to claim 11, wherein the temporary shell component comprises $SiO_2$.

13. The method according to claim 11, wherein the removing of the mesoporous structure comprises etching.

14. The method according to claim 13, wherein the etching comprises selectively chemically removing the mesoporous structure using an etching agent.

15. The method according to claim 14, wherein the etching agent comprises a strong acid and/or a strong base.

16. The method according to claim 11, wherein the catalytic material comprises a metal and/or an alloy thereof and/or an oxide thereof.

17. The method according to claim 16, wherein the metal is copper.

18. The method according to claim 11, wherein the shell material comprises a fluoride, an oxyfluoride, an oxide, and/or a hydroxide.

19. The method according to claim 18, wherein the shell material further comprises a metal.

20. The method according to claim 19, wherein the shell material is selected from the group consisting of $LaF_3$, $CeF_3$, $CaF_2$, $MgF_2$, LaOF, CeOF, $La_2O_3$, $CeO_2$, CaO, MgO, $La(OH)_3$, $Ca(OH)_2$, $Ce(OH)_3$, $Ce(OH)_4$, $Mg(OH)_2$, and combinations thereof.

21. A method of making core-shell nanoparticles comprising:
    providing a catalytic core component comprising a catalytic material;
    coating the catalytic core component with a temporary shell component;
    heating the catalytic core component coated with the temporary shell component to convert the temporary shell component into a mesoporous structure;
    depositing a shell material onto the mesoporous structure, wherein the shell material comprises a fluoride, an oxyfluoride, an oxide, and/or a hydroxide; and
    removing the mesoporous structure to provide a core-shell nanoparticle having a catalytic core encompassed by a mesoporous shell comprising the shell material.

22. The method according to claim 21, wherein the temporary shell component comprises $SiO_2$.

23. The method according to claim 21, wherein the heating of the catalytic core component coated with the temporary shell component is performed at a temperature of between 300° C. and 350° C.

24. The method according to claim 21, wherein the removing of the mesoporous structure comprises etching.

25. The method according to claim 24, wherein the etching comprises selectively chemically removing the mesoporous structure using an etching agent.

26. The method according to claim 25, wherein the etching agent comprises a strong acid and/or a strong base.

27. The method according to claim 21, wherein the catalytic material comprises a metal and/or an alloy thereof and/or an oxide thereof.

28. The method according to claim 27, wherein the metal is copper.

29. The method according to claim 21, wherein the shell material further comprises a metal.

30. The method according to claim 29, wherein the shell material is selected from the group consisting of $LaF_3$, $CeF_3$, $CaF_2$, $MgF_2$, LaOF, CeOF, $La_2O_3$, $CeO_2$, CaO, MgO, $La(OH)_3$, $Ca(OH)_2$, $Ce(OH)_3$, $Ce(OH)_4$, $Mg(OH)_2$, and combinations thereof.

* * * * *